Aug. 15, 1939.   L. C. ROTTER   2,169,291
LUBRICATING APPARATUS
Filed Feb. 9, 1938   2 Sheets-Sheet 1

Lutwin C. Rotter,
Inventor.
Delos G. Haynes,
Attorney.

Aug. 15, 1939.  L. C. ROTTER  2,169,291
LUBRICATING APPARATUS
Filed Feb. 9, 1938  2 Sheets-Sheet 2

Lutwin C. Rotter,
Inventor,
Delos G. Haynes,
Attorney

Patented Aug. 15, 1939

2,169,291

UNITED STATES PATENT OFFICE 2,169,291

LUBRICATING APPARATUS

Lutwin C. Rotter, Maplewood, Mo., assignor to Lincoln Engineering Company, St. Louis, Mo., a corporation of Missouri Application February 9, 1938, Serial No. 189,499

4 Claims. (Cl. 221—47.3)

This invention relates to lubricating apparatus, and with regard to certain more specific features, to apparatus for forcing heavy lubricant of substantially solid form into locomotive side-rod bearings and the like.

Among the several objects of the invention may be noted the provision of a more compact, high-pressure locomotive side-rod lubricator which is more reliable than those heretofore available for the purpose. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal section of the apparatus, being taken on line 1—1 of Fig. 3;

Similar reference characters indicate corresponding parts throughout the several views of the drawings.

The lubricant which is used for side-rods of locomotives and the like is quite heavy and is made up in the form of solid sticks, usually of the order of an inch in diameter and of suitable lengths of a few inches. The lubricant or grease is of solid consistency, but if placed under pressure will deform and flow. It is the object of the present apparatus automatically to cut off portions of lubricant from these stick forms and to force the portions successively into a bearing or the like.

Figure 1:
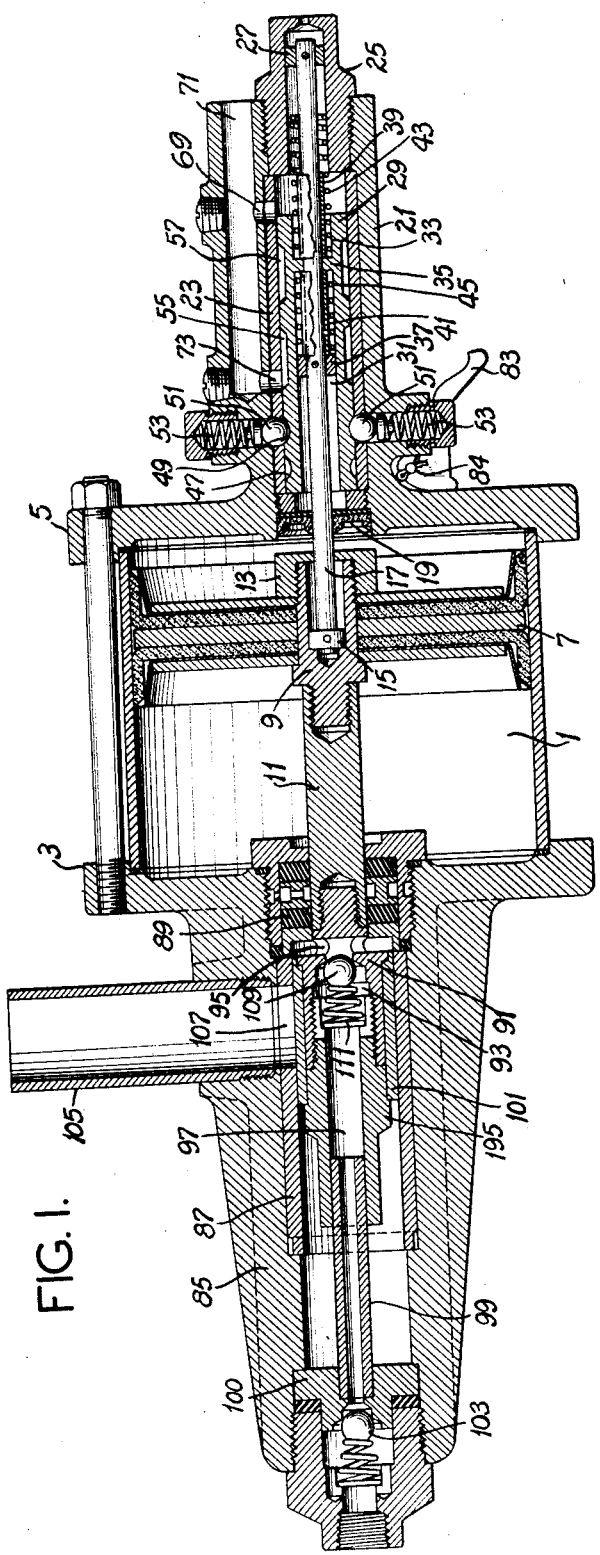

Referring now more particularly to Fig. 1, there is shown at numeral 1 an air cylinder to the opposite ends of which are held heads 3 and 5. The head 3 may be termed an outlet head and the head 5 may be termed a valve head for reasons which will appear.

Within the cylinder is a piston 7 which, through the medium of a hollow stud 9 and threaded cap 13 is fastened to a piston rod 11.

The stud 9 and the screw 13 form a socket for a head 15 of a valve stem 17. The hollow stud 9 provides for lost motion between the piston 7 and the head 15 to the extent that the head 15 may move longitudinally in the hollow stud 9. By this means lost motion is effected between the piston 7 and the valve stem 17.

The valve stem 17 passes through a packing gland 19 and into an extension 21 of the head 5. This extension 21 is provided with a liner 23 which has a press fit therein. A hollow cap 25 forms a pilot bearing for the head 27 at the other end of the valve stem 17.

Within the liner 23 is a piston valve 29 which has two hollow portions 31 and 33 separated by a wall 35. The valve stem 17 passes slidably through the wall 35. To the left and in the hollow 31 the stem 17 is provided a third head 37. Around sleeves 39 and 41 (which surround the stem 17) are located springs 43 and 45 respectively. The sleeves 39, 41 are contacted by heads 27, 37 after springs 43, 45 have been compressed.

The valve is exteriorly provided with a pair of peripheral grooves 47 and 49. These are spaced endwise a distance equal to the desired throw of the valve 29. Oppositely located balls 51 are normally pressed by spring means 53 inwardly through openings in the sleeve 23 to cooperate with one or the other of the grooves 47 or 49. Thus it will be seen that, if the piston 7 is reciprocated, it executes a substantial portion of a stroke before its drives the valve stem 17. Then the valve stem 17 is driven by reason of the lost motion having been taken up within the hollow stem. Then one or the other of the springs 43 or 45 is driven by the respective heads 27 or 37 on the stem 17. Which head becomes operative depends upon the direction of motion of the piston 7. The respective head 27 or 37 compresses the respective spring 43 or 45 but the balls 51 resist valve movement until the respective spring is compressed to a degree whereby its force and/or contact between collar 27 or 37 with sleeve 39 or 41 overcomes the holding action of said balls 51. The valve 29 then suddenly springs to its other position.

For example, in Figure 1, the piston 7 is moving to the right and has taken up all of the lost motion between the head 15 and the hollow stud 9. Furthermore, the head 37 has contacted its respective spring 45 and has about compressed this spring to a point where contact occurs between collar 37 and sleeve 41 and the valve 29 is to be forced with a sudden motion to the right. This will occur when the force of the spring 45 is free of the holding action of the balls 51 caused by collar 37 pushing sleeve 41 positively. Upon occurrence of motion at the valve 29, it will spring to the position wherein the balls 51 are in the left-hand groove 47. The parts are so dimensioned and arranged that the change in valve position takes place at about the end of the stroke of the piston 7, as is apparent from Fig. 1. Thus there is provided a full-stroke, quick-acting valve gear for insuring full strokes of the piston 7.

The valve 29 is ported by adjacent peripheral grooves 55 and 57. In the extension 21 is an inlet port 59 which passes, as shown at 61, through the sleeve 23 (see Fig. 2). When the valve 29 is in the position shown in Fig. 2, the groove 57 receives air from said inlet ports 59, 61 and delivers it to a port 63 which connects with a pipe 65 and passage 67, to deliver air to the left-hand side of the piston 7.

Figure 4:
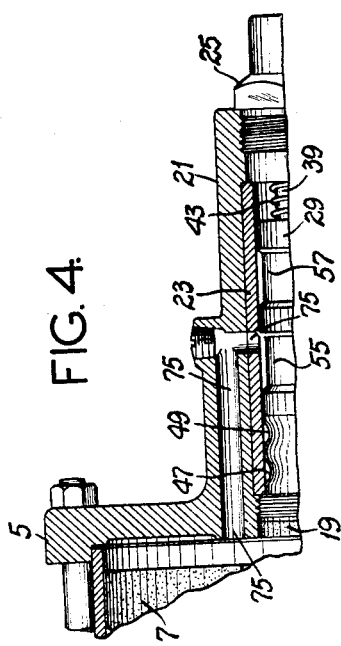
Fig. 4 is a fragmentary section taken on line 4—4 of Fig. 3.

The groove 55 is then in communication with an exhaust port 73. It is also in communication with a passage 75 connecting with the right-hand side of the piston 7 (Fig. 4). Thus, while air under pressure is flowing to the left-hand side of the piston 7, through the passages 59, 61, 57, 63, 65, and 67 (Fig. 2), exhaust air flows from the right-hand side of the piston 7 through the passages 75, 55, 73, and 71 to the atmosphere (Figs. 1 and 4).

Figure 2:
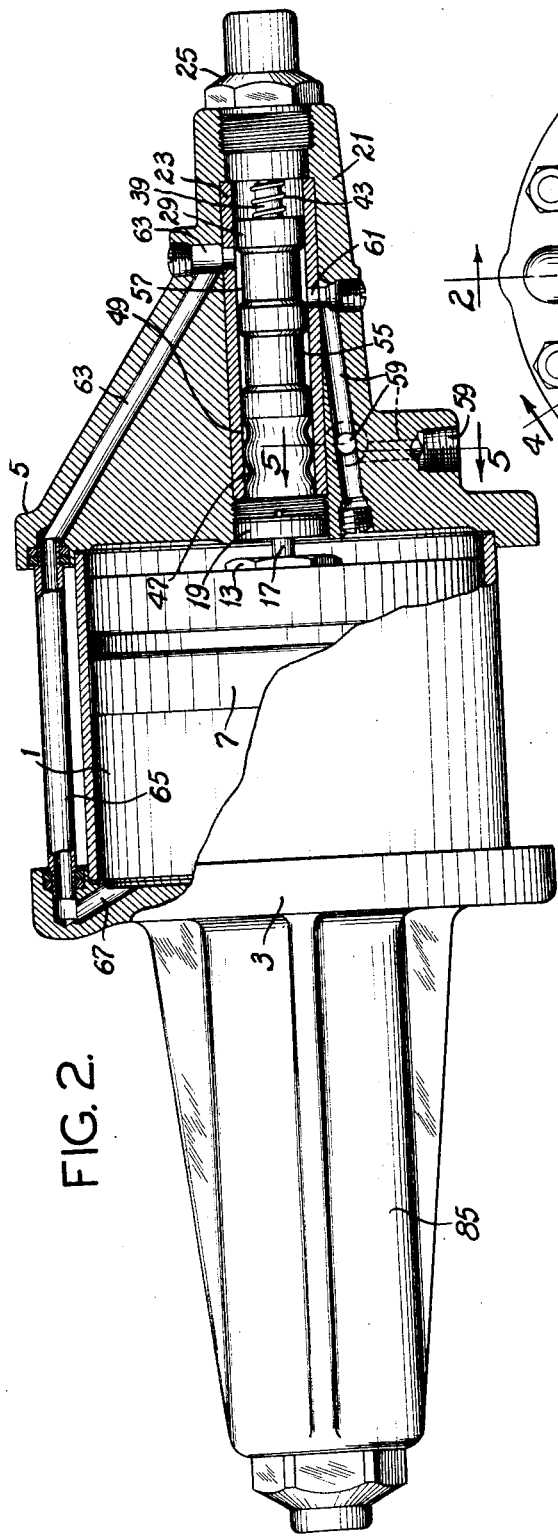
Fig. 2 is a plan view from the left of Fig. 3, parts being broken away to show a section on line 2—2 of Fig. 3.

When the valve 29 is in its other position, (not shown), which is to the right of that shown in Figs. 1 and 2, then the inlet port 61 is out of communication with the groove 57 but is in communication with the moved groove 55. At this time the groove 55 also moves out of communication with the exhaust port 73 (Fig. 1) and comes into communication with the inlet port 59, 61 (Fig. 2) so that air under pressure may flow through the passages 59, 61, 55 and 75 (Figs. 2 and 4), to the right-hand side of the piston 7, thus moving the piston to the left. At the same time, exhaust air may flow from the left-side of the piston 7 through the passages 67, 65, 63, 57, 69 and 71 to the atmosphere (Figs. 2 and 1).

Exhaust ports 69 and 73 both pass to an exhaust manifold 71 which is formed as part of the extension 21. The extension 21 and the manifold 71 form a handle-like grip for one hand of the operator.

Figure 3:
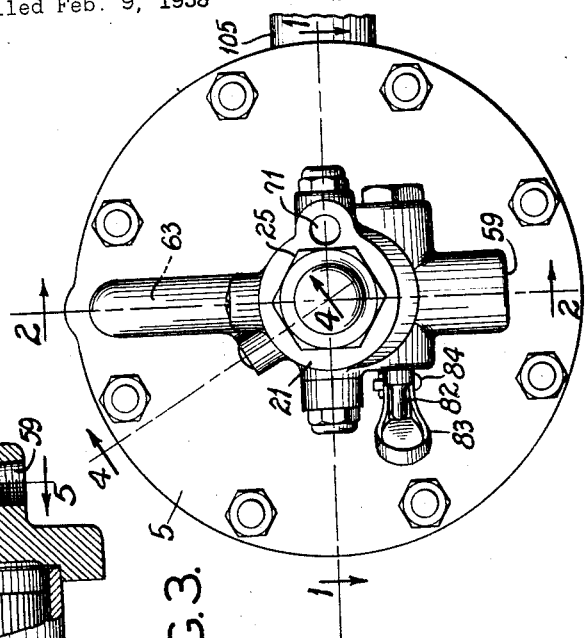
Fig. 3 is a rear elevation taken from the right of Fig. 2.
Figure 5:
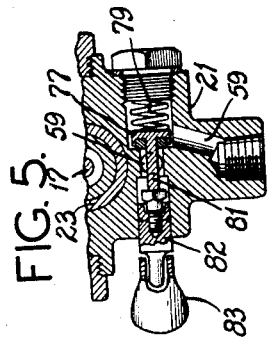
Fig. 5 is a fragmentary section taken on line 5—5 of Fig. 2.

To control the passage of air through the inlet 59, the mechanism shown in Fig. 5 is used. This comprises a valve 77 normally spring pressed to a seat by a spring 79. It seats downstream and forms an obstruction in the inlet 59. The valve 77 is provided with a stem 81, which is operable from a slidable, sealed pin 82. A trigger 83 pivoted at 84 (Fig. 3) serves, when squeezed, to lift the valve from its seat. When the valve is lifted from its seat, air may flow through the inlet passage 59, and when it does flow, the reciprocating action of the piston 7 is continuous under the automatic air distribution action of the valve 29. As shown in Fig. 1, the trigger mechanism 83 is convenient to the trigger or pointer finger of the operator's hand that grips around the extension 21.

The head 3 is formed as a hollow extension 85 in which is a liner 87 forming a hollow outlet cylinder. At the right-hand end is a packing gland 89. The piston rod 11 slidably passes through the gland 89 and has fastened to its left end a spider 91 which is hollow as shown at 93. Inlets 95 communicate between the outside of the spider and the hollow portion 93 and a check valve 109 seats up stream therein. A spring 111 tends to hold the valve 109 to its seat.

Into the left-hand end of the spider 91 is threaded a sleeve 195 which has a cylindric interior 97 slidably cooperating with a cylindric outlet pipe 99. This sleeve 195, with the cooperation of the spider 91, also holds a piston skirt 101. Parts 91, 195 and 101 form a pump piston.

The outlet pipe 99 is fixed to the inner end of the body 100 of inwardly opening check valve 103. This check valve is hereinafter also referred to as an outlet check valve.

Threaded into the side of the extension 85 is a cylinder or sleeve 105 for reception of the stick lubricant. This sleeve 105 is in direct communication with a port 107 in said liner 87.

It will be seen from the above that when the piston 7 reciprocates the piston rod 11 does likewise and that the piston 91, 195 and 101 reciprocates across the port 107. It reciprocates from a position to the left of the port and moves to the right, to cut off the end of the stick of grease that is forced into the cylinder 105 by hand or by gravity.

Since the check valve 109 in the spider 91 normally is pressed to closure by spring 111, the closure is against flow through the ports 95 and the hollow portion 93 of the spider 91.

Operation of the device is as follows:

The operator ordinarily holds the extension 85 in his left hand and the extension 21 in his right hand, while the pointer finger of the right hand is on the trigger 83. By squeezing the trigger, continuous reciprocation of the piston 7 results. This results in continuous reciprocation of the spider 91 and of the piston element 91, 195 and 101.

Assuming that a charge is on the down-stream side of the check valve 109, and piston 91, 195, and 101 moves to the left, valve 109 closes and lubricant is forced from the passage 97 through the inwardly reaching pipe 99 and past the check valve 103. From here it is delivered by a suitable connecting conduit to the locomotive bearing or the like.

When the end of the left-hand stroke is reached, the sleeve 101 is entirely to the left of the port 107, and since the tube or tubular inlet cylinder 105 is directed upwardly and the solid stick lubricant is loose therein, the lubricant stick drops down across part of outlet cylinder 85, 87 so that its lower end is in a position to be cut off by the forward end of the skirt 101. The lubricant is cut off and compressed through the passages 95, past the now open check valve 109, and into the hollow portion 93 within the spider 91, and also into the hollow portion 97 of the tube 195. Thus is the tube 195 primed with a charge prior to expulsion on the pressure stroke. The reciprocating action and forcing of lubricant to the outlet continues repeatedly so long as the trigger 83 is held. When the trigger 83 is released, the valve 77 (Fig. 5) reseats and the action ceases. Incoming air pressure aids spring 79 to reseat the valve 77.

The parts between and including the heads 3 and 5 may be referred to as a full-stroke air engine. The parts associated with the rearward extension on the head 5 may be referred to as the full-stroke valve gear. The parts associated with the forward extension 85 may be referred to as a lubricant pump.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A lubricator for lubricant in substantially solid form, comprising a hollow outlet cylinder, an outlet check valve therefor, tubular means reaching inwardly into the hollow outlet cylinder from said check valve, a tubular inlet cylinder for solid grease connected with the outlet cylinder and located laterally to direct the grease across the outlet cylinder, a hollow piston in the outlet cylinder having a slidable seal with said tubular means, a check valve in said piston, means for reciprocating the piston, said piston being arranged to cross the connection between the two cylinders to cut off inwardly directed lubricant to force said lubricant through the piston, the piston forcing said lubricant through the tubular means upon the opposite stroke.

2. A lubricator comprising an air engine, a valve gear extending from one end of the air engine to form a grip, fluid control means associated with said extension and adapted to be operated by a hand thereon to control flow of fluid to the engine, an extension from the other end of the engine forming an outlet, said extension having a tubular inlet for solid lubricant, a hollow piston in said outlet operated by said engine, a check valve in the piston permitting flow therethrough only toward the outlet, a check valve in the outlet permitting outward flow only, said piston being arranged to traverse the inlet to cut off and compress solid lubricant extending into the inlet, and a tube extending from the outlet to a point within the hollow piston.

3. A lubricator comprising an engine, a cylindric extension from the engine to form an outlet, said extension having a lateral tubular inlet for solid lubricant arranged to direct entering lubricant across the cylindric extension, a hollow piston in said cylindric extension and operated by said engine, and a check valve in the piston permitting flow therethrough toward the outlet, said piston being arranged to cross said inlet to cut off entering solid lubricant and to force the lubricant through the valve in the piston, said valve closing so that the piston forces out lubricant upon a reverse stroke, an outlet check valve, and a tube extending from said outlet check valve with which the hollow piston interiorly and slidably cooperates.

4. A lubricant pump for solid lubricant comprising a cylindrical part having an outlet, a check valve in the outlet, said cylindrical part having an inlet for the reception of solid lubricant arranged to direct entering lubricant across the cylindrical part, a hollow piston in the hollow member and arranged to reciprocate from a position at one side of said inlet to a position covering the inlet, said piston being hollow, a stationary tube communicating between said outlet and slidably arranged within said hollow piston, and a check valve within the piston.

LUTWIN C. ROTTER.